US009050987B2

(12) United States Patent
Gower et al.

(10) Patent No.: US 9,050,987 B2
(45) Date of Patent: *Jun. 9, 2015

(54) COLLAPSIBLE TWO SEAT PERAMBULATOR

(71) Applicant: PHIL AND TEDS MOST EXCELLENT BUGGY COMPANY LIMITED, Newtown, Wellington (NZ)

(72) Inventors: Campbell Gower, Wellington (NZ); Philip Brace, Wellington (NZ)

(73) Assignee: PHIL AND TEDS MOST EXCELLENT BUGGY COMPANY LIMITED, Newton, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,437

(22) Filed: Jan. 5, 2015

(65) Prior Publication Data
US 2015/0108737 A1    Apr. 23, 2015

Related U.S. Application Data

(63) Continuation of application No. 14/462,234, filed on Aug. 18, 2014, which is a continuation of application No. 14/261,209, filed on Apr. 24, 2014, now Pat. No. 8,840,132, which is a continuation of application No.

(Continued)

(51) Int. Cl.
B62B 7/08    (2006.01)
B62B 7/00    (2006.01)
B62B 9/12    (2006.01)

(52) U.S. Cl.
CPC .. B62B 7/008 (2013.01); B62B 9/12 (2013.01)

(58) Field of Classification Search
CPC .............. B62B 7/08; B62B 9/28; B62B 9/12; B62B 7/008; B62B 7/10
See application file for complete search history.

(56) References Cited

U.S. PATENT DOCUMENTS 2,769,482 A    11/1956  Carlson
2,798,733 A    7/1957   Gill (Continued)

FOREIGN PATENT DOCUMENTS

CN    2417096 Y    1/2001
CN    2635486 Y    8/2004

(Continued)

OTHER PUBLICATIONS

Great Britain Examination Report dated Nov. 25, 2009 re Application No. GB0919610.6.

(Continued)

Primary Examiner — J. Allen Shriver, II
Assistant Examiner — Jacob Meyer
(74) Attorney, Agent, or Firm — Troutman Sanders LLP; Ryan A. Schneider; John A. Morrissett

(57)  ABSTRACT

A buggy for transporting children has a frame and wheels that are rotably mounted relative to the frame to support the frame above a ground surface. A primary seat is operatively supported by the frame for supporting a first child. A secondary seat is operatively supported by the frame for supporting a second child. The buggy is convertible between an in use configuration for transporting children and a folded storage configuration, whether or not the secondary seat is attached. The secondary seat may be detachable. The secondary seat may be positioned at least partly behind and at least partly below the primary seat.

20 Claims, 15 Drawing Sheets

Related U.S. Application Data

14/180,158, filed on Feb. 13, 2014, now abandoned, which is a continuation of application No. 14/074,515, filed on Nov. 7, 2013, now Pat. No. 8,708,364, which is a continuation of application No. 13/735,977, filed on Jan. 7, 2013, now Pat. No. 8,702,118, which is a continuation of application No. 12/595,733, filed as application No. PCT/NZ2007/000264 on Sep. 7, 2007, now Pat. No. 8,371,606.

(60) Provisional application No. 60/923,318, filed on Apr. 13, 2007.

(56) References Cited

U.S. PATENT DOCUMENTS

| | | | |
|---|---|---|---|
| 2,857,953 A | 10/1958 | Berger et al. | |
| 2,993,702 A | 7/1961 | Gill | |
| 3,235,279 A | 2/1966 | Smith et al. | |
| 3,309,101 A | 3/1967 | Romay | |
| 4,542,915 A | 9/1985 | Wheeler, III et al. | |
| 4,725,071 A | 2/1988 | Shamie | |
| 4,858,947 A | 8/1989 | Yee et al. | |
| D311,363 S | 10/1990 | Lin | |
| 5,018,754 A | 5/1991 | Cheng | |
| D321,850 S | 11/1991 | Mong-Hsing | |
| D328,047 S | 7/1992 | Huang | |
| 5,167,425 A | 12/1992 | Chen | |
| 5,184,835 A | 2/1993 | Huang | |
| 5,263,730 A | 11/1993 | Roach et al. | |
| 5,333,893 A | 8/1994 | Chen | |
| 5,338,096 A | 8/1994 | Huang | |
| 5,417,449 A | 5/1995 | Shamie | |
| D359,937 S | 7/1995 | Yoshie et al. | |
| D375,706 S | 11/1996 | Haung | |
| 5,653,460 A | 8/1997 | Fogarty | |
| 5,664,795 A | 9/1997 | Haung | |
| 5,722,682 A | 3/1998 | Wang | |
| 5,911,432 A | 6/1999 | Song | |
| 6,045,145 A | 4/2000 | Lan | |
| 6,086,087 A | 7/2000 | Yang | |
| D429,664 S | 8/2000 | Gehr | |
| D430,076 S | 8/2000 | Gehr | |
| D431,212 S | 9/2000 | Haung | |
| 6,209,892 B1 | 4/2001 | Schaaf et al. | |
| 6,267,406 B1 | 7/2001 | Huang | |
| D455,679 S | 4/2002 | Tai et al. | |
| 6,378,892 B1 * | 4/2002 | Hsia | 280/650 |
| 6,497,424 B2 | 12/2002 | Gartner et al. | |
| 6,585,284 B2 | 7/2003 | Sweeney et al. | |
| 6,676,140 B1 * | 1/2004 | Gondobintoro | 280/33.993 |
| 6,702,316 B2 | 3/2004 | Hsia | |
| 6,843,498 B2 | 1/2005 | Bretschger et al. | |
| 6,877,761 B2 | 4/2005 | Hsia | |
| 6,935,652 B2 | 8/2005 | Fair et al. | |
| 6,979,017 B2 | 12/2005 | Chen | |
| 7,320,471 B2 | 1/2008 | Maciejczyk | |
| 7,451,999 B1 | 11/2008 | Liu | |
| D587,635 S | 3/2009 | Gower et al. | |
| D614,540 S | 4/2010 | Andrews et al. | |
| D616,337 S | 5/2010 | Kho et al. | |
| D616,338 S | 5/2010 | Kho et al. | |
| D636,300 S | 4/2011 | Greger et al. | |
| 7,938,433 B2 | 5/2011 | Pike et al. | |
| 8,070,179 B2 | 12/2011 | Pike et al. | |
| 8,157,273 B2 | 4/2012 | Bar-Lev | |
| 8,186,705 B2 | 5/2012 | Greger et al. | |
| 8,205,894 B2 | 6/2012 | Li | |
| 8,366,141 B2 * | 2/2013 | Crisp | 280/658 |
| 2003/0020259 A1 | 1/2003 | Tai et al. | |
| 2003/0227157 A1 | 12/2003 | Bretschger et al. | |
| 2006/0290107 A1 | 12/2006 | Powers | |
| 2007/0001429 A1 | 1/2007 | Maciejczyk | |
| 2007/0085303 A1 | 4/2007 | Cheng | |
| 2007/0222167 A1 | 9/2007 | Pike et al. | |
| 2007/0296182 A1 | 12/2007 | Saville et al. | |
| 2008/0073877 A1 | 3/2008 | Pike et al. | |
| 2008/0150247 A1 | 6/2008 | Lake | |
| 2008/0246332 A1 * | 10/2008 | Winefordner et al. | 301/124.2 |
| 2009/0039620 A1 | 2/2009 | Ryan et al. | |
| 2010/0038886 A1 | 2/2010 | Greger et al. | |
| 2010/0038887 A1 | 2/2010 | Bar-Lev | |
| 2010/0072732 A1 | 3/2010 | Offord | |
| 2010/0078916 A1 | 4/2010 | Chen | |
| 2010/0109292 A1 | 5/2010 | Chen et al. | |
| 2010/0140902 A1 | 6/2010 | Zehfuss | |
| 2010/0282800 A1 | 11/2010 | Li et al. | |
| 2012/0153583 A1 | 6/2012 | Yuan | |

FOREIGN PATENT DOCUMENTS

| | | |
|---|---|---|
| GB | 2445339 A | 5/2007 |
| JP | 10291480 A | 11/1998 |

OTHER PUBLICATIONS

International Preliminary Report on Patentability re International Application No. PCT/NZ2007/000264; date of completion of report May 13, 2009.

International Searching Authority, "Notification of Transmittal of the International Search Report" for PCT/NZ2007/000264, May 21, 2008.

* cited by examiner

COLLAPSIBLE TWO SEAT PERAMBULATOR

CROSS REFERENCE TO RELATED APPLICATION

This application is a continuation of U.S. patent application Ser. No. 14/462,234, filed Aug. 18, 2014, which is a continuation of U.S. patent application Ser. No. 14/261,209 (now U.S. Pat. No. 8,840,132), filed Apr. 24, 2014, which is a continuation of U.S. patent application Ser. No. 14/180,158, filed Feb. 13, 2014, which is a continuation of U.S. patent application Ser. No. 14/074,515 (now U.S. Pat. No. 8,708, 364), filed Nov. 7, 2013, which is a continuation of U.S. patent application Ser. No. 13/735,977 (now U.S. Pat. No. 8,702,118), filed Jan. 7, 2013, which is a continuation of U.S. patent application Ser. No. 12/595,733 (now U.S. Pat. No. 8,371,606), filed Apr. 14, 2010, which is a 371 national phase application of PCT/NZ2007/000264, filed Sep. 7, 2007, which claims priority to U.S. Provisional Application No. 60/923,318, filed Apr. 13, 2007, each of which is hereby incorporated by reference in its entirety.

FIELD OF THE INVENTION

The invention relates to a child's buggy for transporting a baby or toddler. In particular, the invention relates to a child's buggy suitable for concurrently transporting two children.

BACKGROUND

Conventionally, babies and toddlers have been transported in a buggy. Conventional buggies are suitable for transporting only a single child. If parents have another child when the earlier child is still at the toddler stage, it is generally necessary to purchase a new buggy that is suitable for transporting two children. Some of those two child buggies are "baby train" types having two full size fixed in-line seats. Others are twin configurations having two full sized fixed side-by-side seats. Both types are large vehicles that are not very manoeuvrable. Additionally, those vehicles have fixed seats. That is, while the seats could perhaps be removed from their frames, that would be a time consuming and complex action requiring the use of tools. It is not intended for the seats to be removed from the frames in normal use.

Another issue is that it is generally desirable that a buggy has a compact collapsed storage configuration, so it can be readily transported when not in use. Some "baby train" buggies can fold, but due to their fixed seat configuration they still take up a large amount of space when folded. That is also an issue with the existing side-by-side buggies.

An alternative configuration two seat buggy is sold by Phil and Teds Most Excellent Buggy Company Limited of Wellington, New Zealand, as the Sport buggy. The Sport buggy has a fixed primary front seat and a detachable secondary rear seat. The buggy can also be folded for storage. However, the buggy cannot be folded for storage when the secondary rear seat is attached. With that buggy, extra actions are required to remove the secondary rear seat prior to folding the buggy. It is then necessary to reattach the secondary rear seat after unfolding the buggy if a second child is to be transported in the buggy.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a buggy for transporting children that provides a compact collapsed configuration with two seats without detaching the secondary seat, and/or to at least provide the public with a useful alternative.

SUMMARY OF THE INVENTION

The term 'comprising' as used in this specification and claims means 'consisting at least in part of', that is to say when interpreting statements in this specification and claims which include that term, the features, prefaced by that term in each statement, all need to be present but other features can also be present. The terms "comprise", "comprises", and "comprised" should be interpreted in the same way.

In a first aspect, the invention broadly consists in a buggy for transporting children, comprising:
  a frame;
  a plurality of wheels that are rotatably mounted relative to the frame to support the frame above a ground surface and which enable the buggy to be moved along the ground surface;
  a primary seat operatively supported by the frame for supporting a first child;
  a readily attachable and detachable secondary seat for supporting a second child;
  wherein the buggy has an in use configuration for transporting children and a collapsed storage configuration, and is convertible between the in use configuration and the storage configuration whether or not the secondary seat is attached.

As used herein, "readily attachable and detachable" means that the seat can be attached and detached without the use of tools. The attachment could be any suitable form, such as a quick release mechanism, clips, clamps, or sleeves that receive portions of the frame for example.

The primary seat may be permanently attached, detachable, or readily attachable and detachable.

The secondary seat is preferably readily attachable to the frame in a first position at least partly behind and at least partly below the primary seat. The buggy is preferably convertible between the in use configuration and the storage configuration whether or not the secondary seat is attached in the first position.

The secondary seat is preferably readily attachable to the frame in a second position at least partly above and at least partly in front of the primary seat. The buggy is preferably convertible between the in use configuration and the storage configuration whether or not the secondary seat is attached in the second position.

The buggy may be configured such that when the secondary seat is in the first position at least partly behind and at least partly below the primary seat, and the buggy is moved from the in use configuration to the collapsed storage configuration, at least part of the primary seat must move, at least to some extent, to enable the buggy to collapse. The configuration may be such that said at least part of the primary seat is manually moved to enable the buggy to collapse. However, it is preferred that said at least part of the primary seat moves automatically as a result of the secondary seat movement.

The secondary seat may have a secondary seat frame that pushes against the primary seat during the collapsing, causing the movement of at least part of the primary seat. The secondary seat frame may have a curved configuration to provide a smooth surface that engages the primary seat during the collapsing. Alternatively, the secondary seat itself may push against the primary seat.

At least part of the primary seat may be invertible to provide clearance for the secondary seat. Alternatively, the primary seat could be supported by an arrangement that enables the primary seat to move out of the way as the buggy is collapsed, such as hinges or pivots for example.

It is preferred that the secondary seat is smaller than the primary seat.

The secondary seat may be pivotally supported by the frame, either directly or via a secondary seat frame. The buggy may be configured such that the secondary seat is selectively pivotable from an in use position to a storage position, without collapsing the remainder of the buggy. Preferably, following the movement of the secondary seat to the storage position, the remainder of the buggy can then be collapsed around the secondary seat.

The primary seat may be convertible from a sitting configuration for supporting a toddler to a lying configuration for supporting a baby. This, and the option of two attachment positions for the secondary seat, enables the preferred embodiment buggy to "grow" with a family. For example, the buggy can support a newborn or baby in the primary seat in its lying configuration. As the child grows into a toddler, the primary seat can be used in its sitting configuration to support the toddler. If a family then has another baby, the baby can be supported in the primary seat in its lying configuration, and the toddler can be supported in the secondary seat in the second attached position at least partly above and at least partly in front of the primary seat. Once both children reach the toddler stage, the larger child can be supported in the primary seat in its sitting configuration, and the smaller child can be supported in the secondary seat in the first attached position at least partly behind and at least partly below the primary seat.

The primary seat may be permanently attached, detachable, or readily attachable and detachable.

In a second aspect, the invention broadly consists in a buggy for transporting children, comprising:
 a frame;
 a plurality of wheels that are rotatably mounted relative to the frame to support the frame above a ground surface and which enable the buggy to be moved along the ground surface;
 a primary seat operatively supported by the frame for supporting a first child;
 a secondary seat operatively supported by the frame for supporting a second child and that is positioned at least partly behind and at least partly below the primary seat;
 wherein the buggy is convertible between an in use configuration for transporting children and a folded storage configuration, without removing the secondary seat.

The secondary seat may be permanently attached, detachable, or readily attachable and detachable.

Preferably, the secondary seat is readily attachable to the frame in a second position at least partly above and at least partly in front of the primary seat. The buggy is preferably convertible between the in use configuration and the storage configuration whether or not the secondary seat is attached in the second position.

The buggy may be configured such that when the secondary seat is positioned at least partly behind and at least partly below the primary seat, and the buggy is moved from the in use configuration to the collapsed storage configuration, at least part of the primary seat must move, at least to some extent, to enable the buggy to collapse. The configuration may be such that said at least part of the primary seat is manually moved to enable the buggy to collapse. However, it is preferred that said at least part of the primary seat moves automatically as a result of the secondary seat movement.

The secondary seat may have a secondary seat frame that pushes against the primary seat during the collapsing, causing the movement of at least part of the primary seat. The secondary seat frame may have a curved configuration to provide a smooth surface that engages the primary seat during the collapsing. Alternatively, the secondary seat itself may push against the primary seat.

At least part of the primary seat may be invertible to provide clearance for the secondary seat. Alternatively, the primary seat could be supported by an arrangement that enables the primary seat to move out of the way as the buggy is collapsed, such as hinges or pivots for example.

It is preferred that the secondary seat is smaller than the primary seat.

The secondary seat may be pivotally supported by the frame, either directly or via a secondary seat frame. The buggy may be configured such that the secondary seat is selectively pivotable from an in use position to a storage position, without collapsing the remainder of the buggy. Preferably, following the movement of the secondary seat to the storage position, the remainder of the buggy can then be collapsed around the secondary seat.

The primary seat may be convertible from a sitting configuration for supporting a toddler to a lying configuration for supporting a baby.

Where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred forms of the present invention will now be described by way of example only and with reference to the accompanying drawings in which.

DETAILED DESCRIPTION

Figure 1:
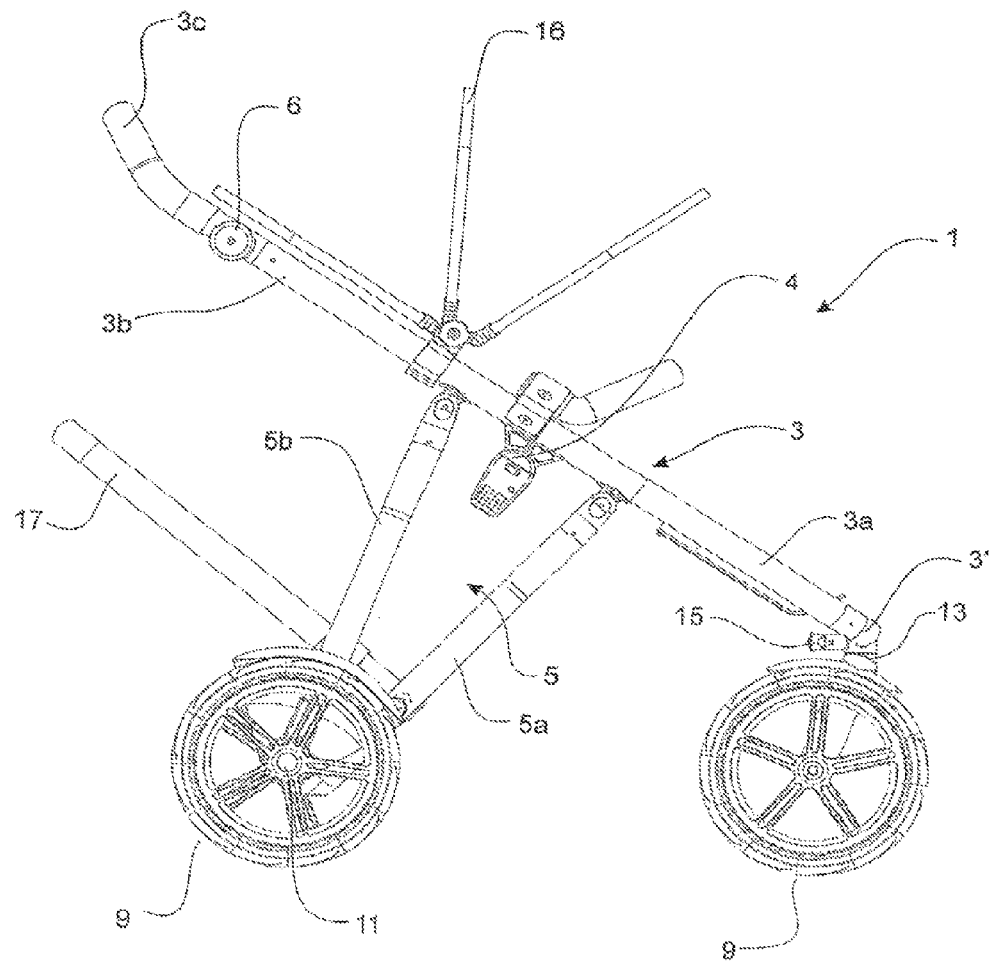
FIG. 1 is a side elevation view of a preferred form buggy with a secondary seat frame attached in a first position and the buggy in an in use configuration.
Figure 2A:
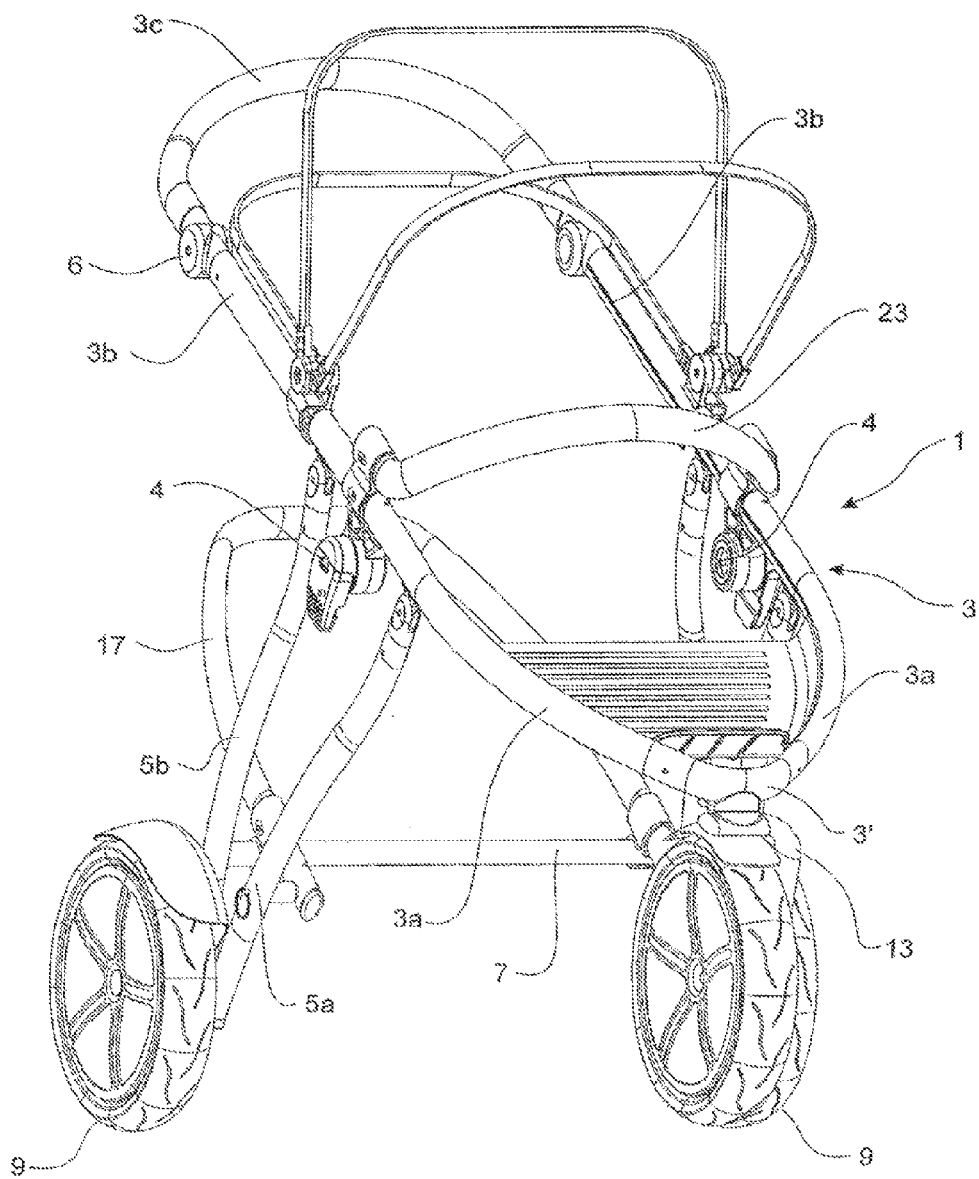
FIG. 2a is a front overhead perspective view of the buggy of FIG. 1.
Figure 2B:
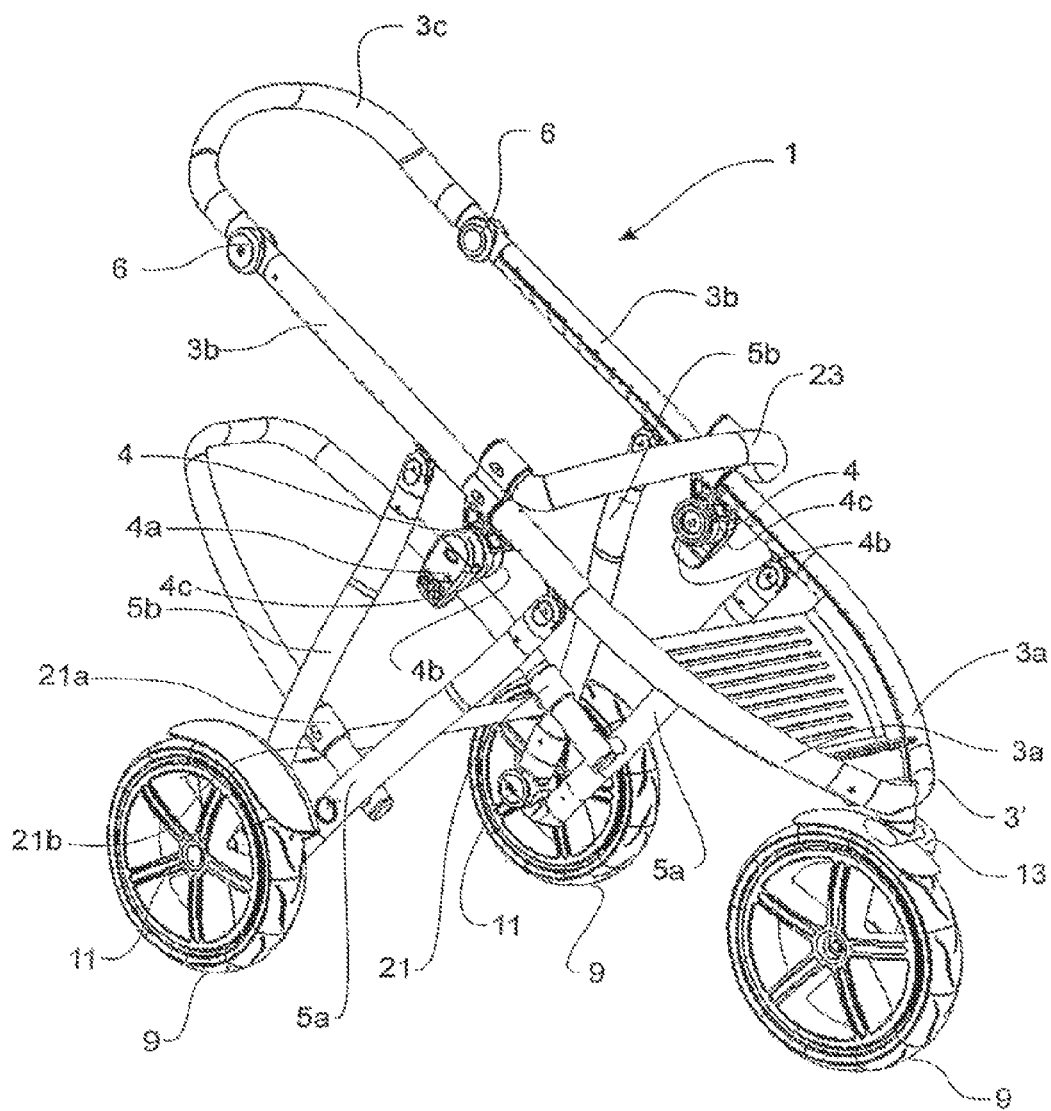
FIG. 2b is a front overhead perspective view from a slightly different angle than FIG. 2a, and with the hood support removed.

Referring to FIGS. 1 to 2b, a preferred embodiment buggy for transporting a baby or toddler as indicated by reference numeral 1 and is shown in an in use configuration. The buggy has a frame having a primary seat frame section 3 and a wheel support section 5. The primary seat frame section 3 has a forward lower section 3a and an intermediate section 3b. The lower section 3a comprises two spaced apart members that taper toward and interconnect with each other at their forward ends to form a nose region 3'. The lower section 3a is articulated relative to the intermediate section 3b via couplings 4 that will be described in further detail below. The intermediate section 3b has members that are generally parallel and extend upwardly and rearwardly from the couplings 4. The upper rearward section 3c of the primary seat frame section 3 frame forms a handle to enable a user to push or pull the buggy.

The handle 3c is articulated relative to the intermediate section 3b via couplings 6. The couplings 6 enable the handle to be selectively tilted relative to the intermediate section 3b, to obtain a comfortable position for the user. The couplings 6 may have a frictional mechanism that enables the handle to be tilted and to then maintain a tilted configuration. Rather than having a single handle, two spaced apart handles could be provided.

The primary seat frame section 3 operatively supports a primary seat for supporting a first child. The primary seat will generally be formed of a flexible material such as a woven or non-woven fabric, canvas, or polymeric membrane for example. In most of the figures, the primary and secondary seats are not shown so the movement of the frame can be readily determined. However, FIGS. 8-11 show the collapsing of the buggy including the primary seat 17a and the secondary seat 8. The primary seat is coupled to the frame members of the forward section 3a and intermediate section 3b by any suitable means. For example, fasteners such as screws, clips, or snap domes could be used to attach the primary seat to the primary seat frame section 3. Alternatively, the seat could be formed with sleeves that surround and capture the frame members. As another alternative, part of the seat could be received in slots in the frame members. Any other suitable means could be provided.

The wheel support section 5 of the frame has a pair of forward struts 5a that are articulated relative to the frame members of the forward frame section 3a and extend downwardly and rearwardly therefrom. A pair of rearward struts 5b are articulated relative to the frame members of the intermediate frame section 3b and extend downwardly and rearwardly therefrom. The articulation could be via hinges or pivots for example. The struts 5a, 5b on each side of the frame converge towards each other distal from the primary seat frame section 3. On each side of the frame, the struts are connected to a wheel support arrangement 11. The connection to the wheel support arrangement enables the struts to articulate relative to one another. Each wheel support arrangement 11 rotatably supports a rear wheel 9. The pair of rear wheels support the frame above the ground. A cross bar 7 extends between the two rear struts 5b toward the lower end thereof.

A front wheel 9 is rotatably supported from the nose 3' of the frame via a front strut 13 to support the frame above the ground. The wheels are preferably provided with pneumatic tyres to provide some "all terrain" capability for the buggy. In the preferred form shown, the front strut 13 is rotatable about a generally vertical axis, so that the front wheel can change direction relative to the frame to enhance manoeuvrability of the buggy. The strut is provided with an adjuster 15. The adjuster provides a tension adjustment of the front strut 13. Movement of the adjuster alters the amount of force required to rotate the strut 13 about the generally vertical axis. At one extreme of the adjuster, there is very little, if any, tension against the rotation. At the other extreme, rotation of the front strut may be prevented to provide a fixed front wheel orientation which may be preferred by some users. Although not shown in any detail, the front strut will generally have a shaft extending upwardly therefrom that is received in the sleeve in the nose section of the frame. The adjuster 15 will be threaded into the sleeve and will engage against the shaft to control the tension.

The buggy is provided with a hood support 16 for a hood that provides some level of cover for a toddler or baby in the primary seat. The hood support is preferably angularly adjustable as shown, and may be fully detachable.

As can be seen most clearly from FIGS. 1 and 2b, the buggy also has a secondary seat frame 17 for supporting a secondary seat. The secondary seat enables the buggy to be used to transport a second child. In the embodiment shown, the secondary seat frame is readily attachable to and detachable from the frame 3, 5 without the use of tools. The secondary seat frame 17 has a generally inverted "U" configuration. The secondary seat will generally be smaller than the primary seat.

Figure 7:
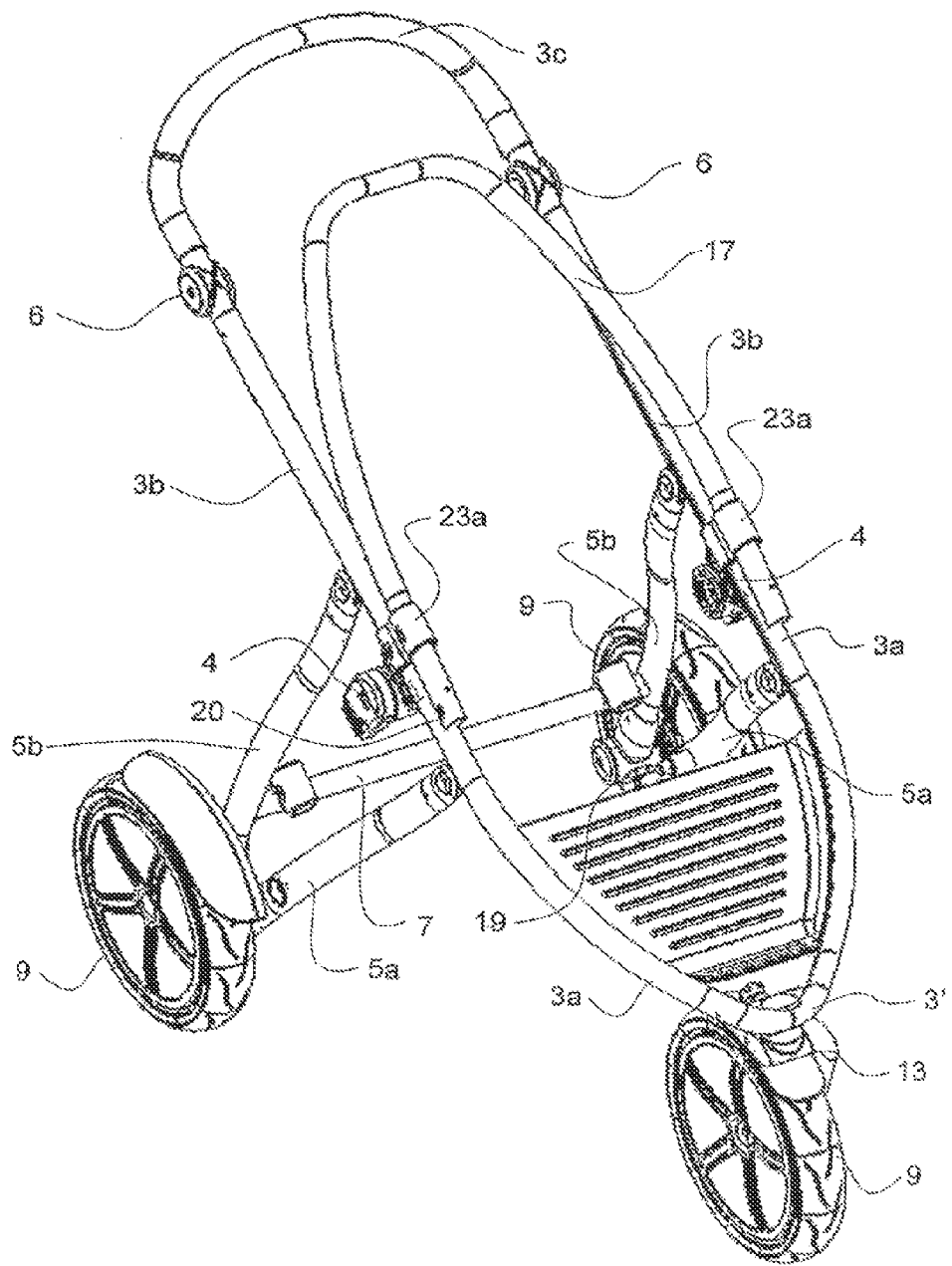
FIG. 7 is a front overhead perspective view of the buggy of FIG. 1 with the secondary seat frame attached in a second position.

As can be seen most clearly in FIG. 7, each forward strut 5a of the wheel support section is provided with an inwardly directed spigot 19 toward a lower end thereof. A lower end of each side of the secondary seat frame 17 contains a complementary recess for receipt of the spigot 19. The spigot 19 may be configured to snap fit into the respective recess 20. Alternatively, the spigot may be a relatively loose fit. The spigot may be biased into a projecting position.

Reverting to FIG. 2b, each side of the secondary seat frame 17 is provided with a cross bar coupling 21. The cross bar couplings each comprise a first recess 21a that receives the secondary seat frame 17. The cross bar coupling 21 additionally has a transversely oriented recess 21b for receiving the cross bar. The secondary seat frame 17 is rigidly supported between the forward struts 5a and the cross bar extending between the rearward struts 5b. The cross bar couplings 21 provide a pivoting connection between the secondary seat frame 17 and the cross bar/rearward struts; however, the pivoting is prevented when the spigots 19 are received in the recesses 20. This mechanism results in the secondary seat frame being operatively supported by the primary seat frame, which in turn is supported above a ground surface by the wheels.

The secondary seat frame preferably has some resilience and the transversely oriented recesses 21b may be slidable on the cross bar, so the sides of the secondary seat frame can be compressed towards one another by a user. As that occurs, the recesses 20 will clear the spigots 19, enabling the secondary seat frame to be pivoted upwardly and forwardly relative to the cross bar and rearward struts. Alternatively, if the spigots are biased, providing sufficient upward force to the secondary seat frame 17 will cause the recesses to clear the spigots, so the secondary seat frame can be pivoted upward and forward.

As a further alternative, one or more actuators may be provided in a position that is readily accessible by a user standing or crouching behind the buggy, to release the spigots from the recesses. For example, there may be an actuator on the outside of each strut 5a, configured such that as the actuators are pulled outwardly, the spigots clear the recesses.

Any other suitable means could be used for attaching the secondary seat frame to the buggy.

The secondary seat can be mounted to the secondary seat frame 17 by any of the means described above for the primary seat, or by any other suitable means.

Figure 6:
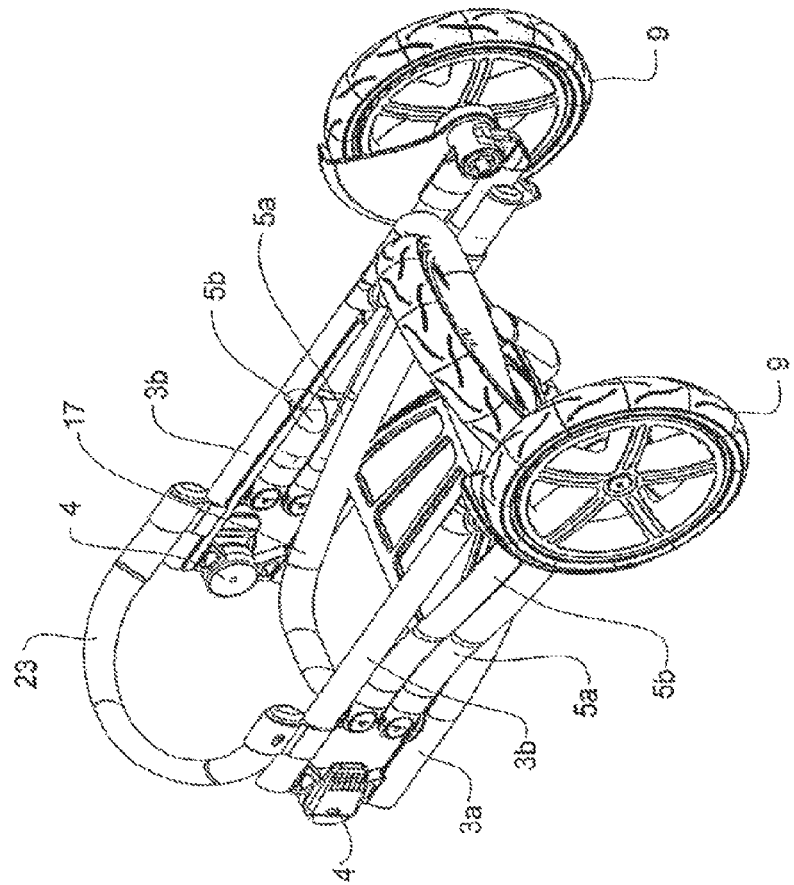
FIG. 6 is a front overhead perspective view of the buggy in the collapsed storage configuration.
Figure 5:
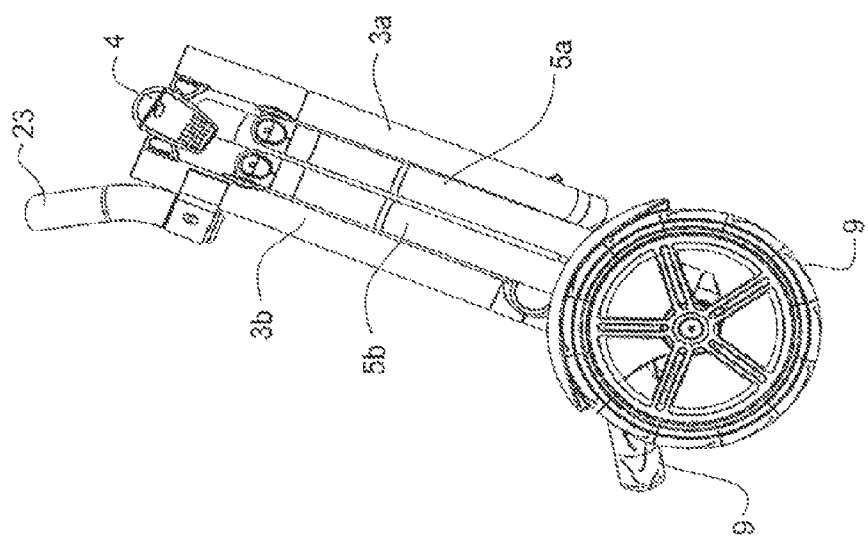
FIG. 5 is a side elevation view of the buggy of FIG. 1 in the collapsed storage configuration.

It is desirable that the buggy is convertible between the in use configuration shown in FIGS. 1 to 2b and a collapsed or folded storage configuration shown in FIGS. 5 and 6. The buggy is designed such that it is convertible between the in use configuration and the storage configuration whether or not the secondary seat is attached.

Figure 3:
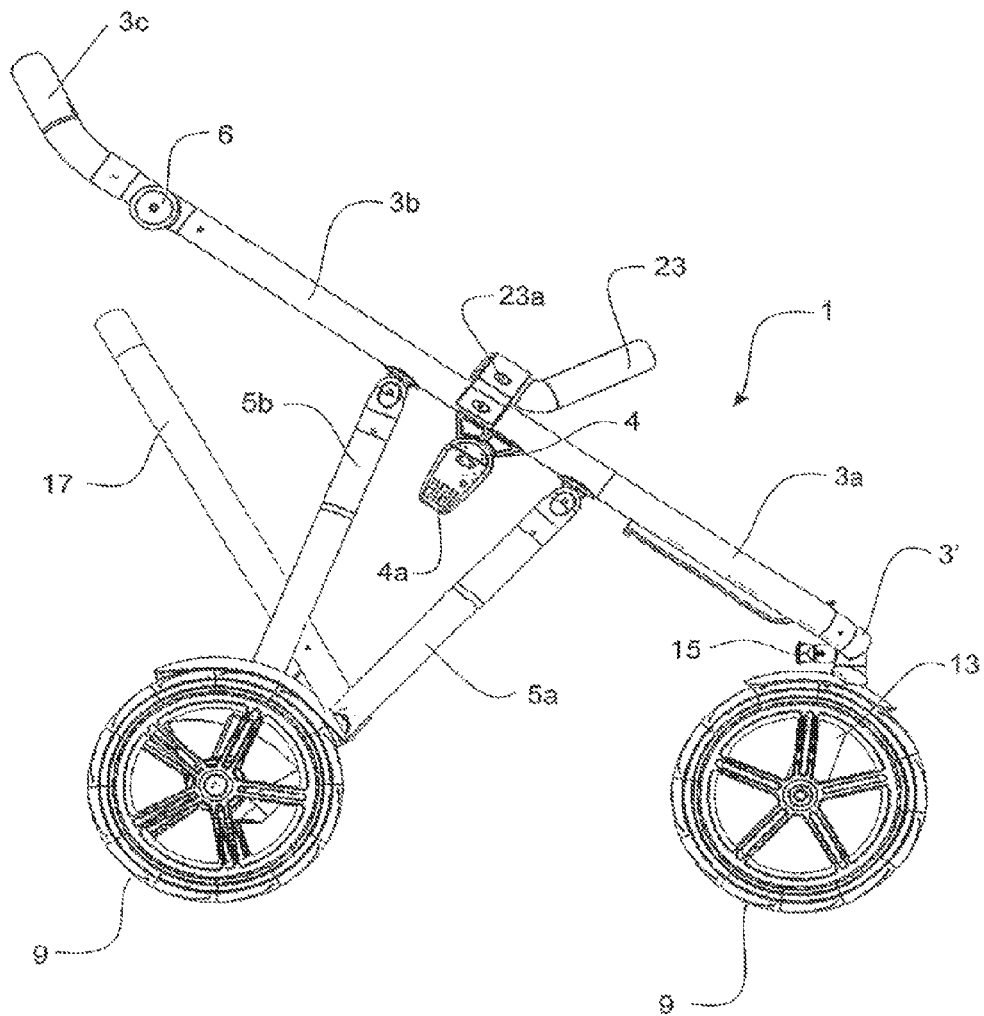
FIG. 3 is a side elevation view of the buggy of FIG. 1 with the secondary seat frame being moved from an in use position toward a storage position.
Figure 4:
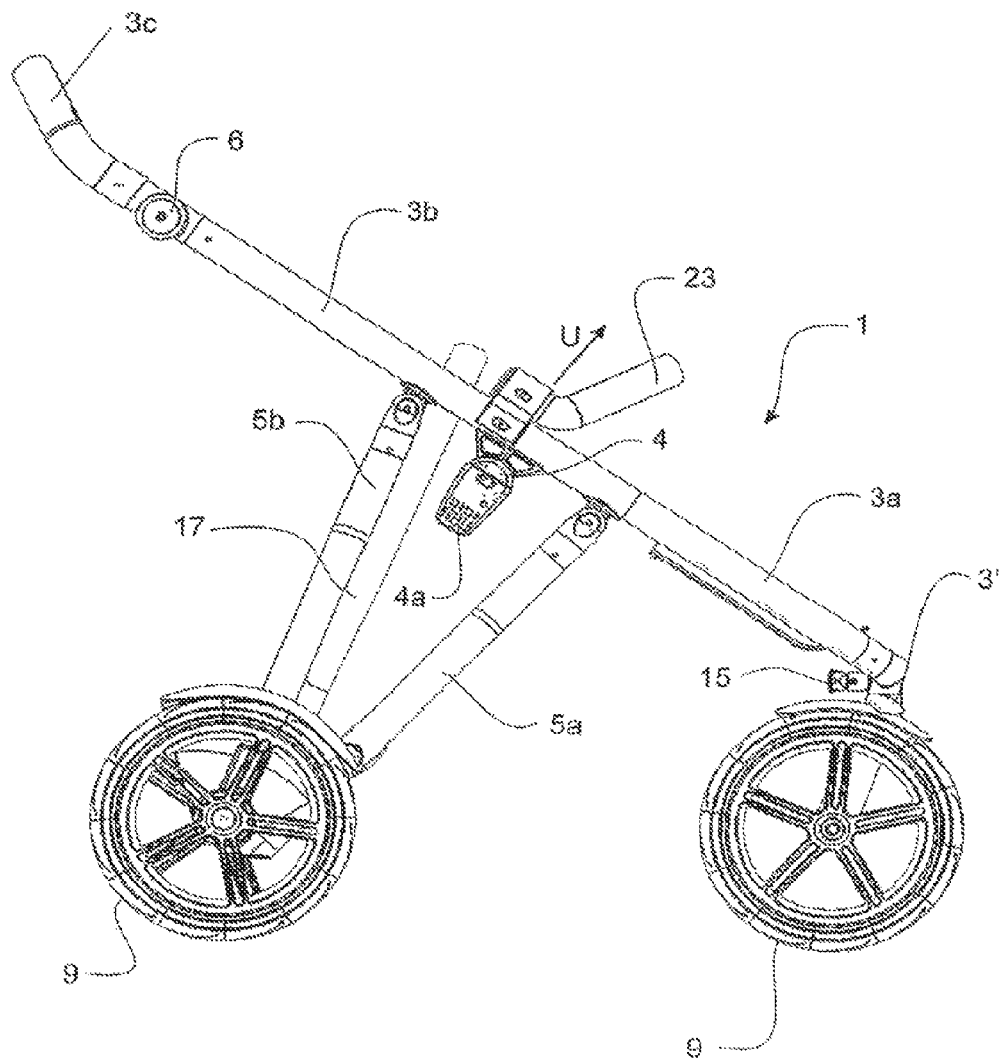
FIG. 4 is a side elevation view of the buggy of FIG. 1 with the secondary seat frame in the storage position.
Figure 8:
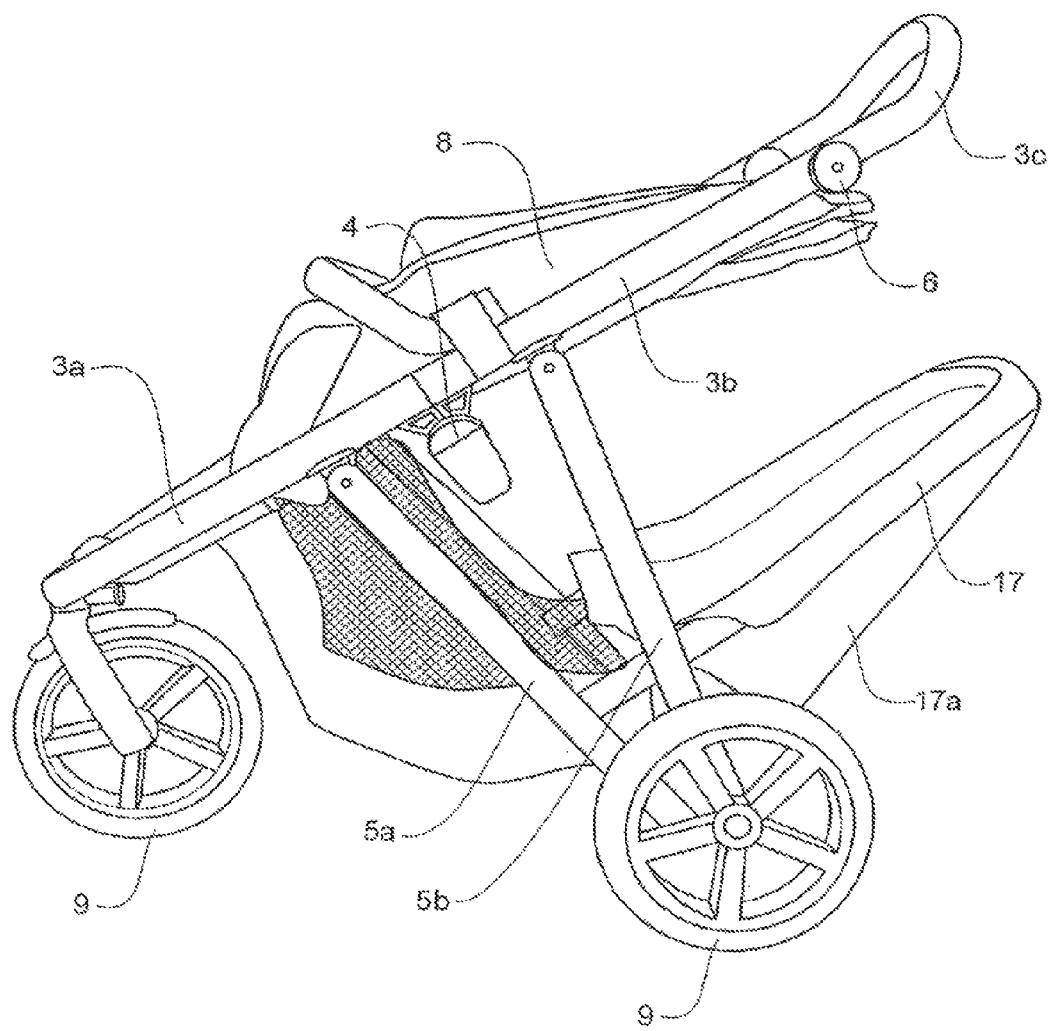
FIG. 8 is a side elevation view of the buggy of FIG. 1, but with the primary seat inverted to make way for movement of the secondary seat.
Figure 9:
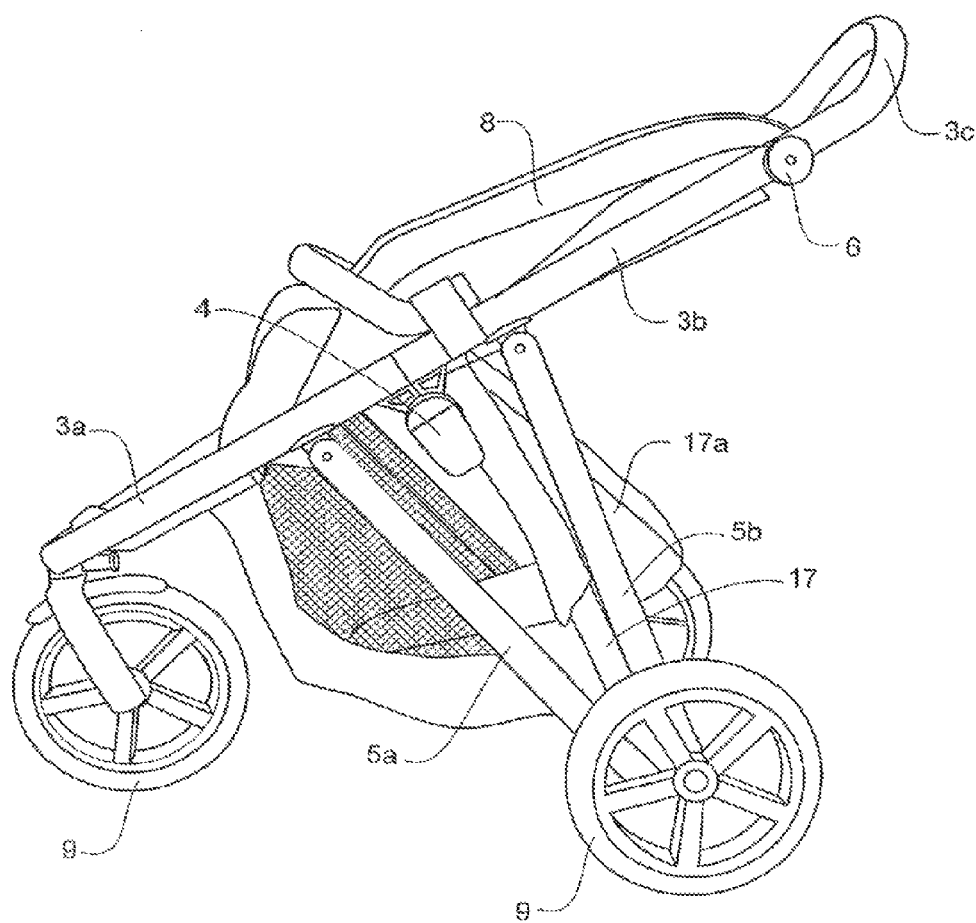
FIG. 9 is a side view of the buggy of FIG. 8, but with the secondary seat pivoted forward and upward under the primary seat.
Figure 10:
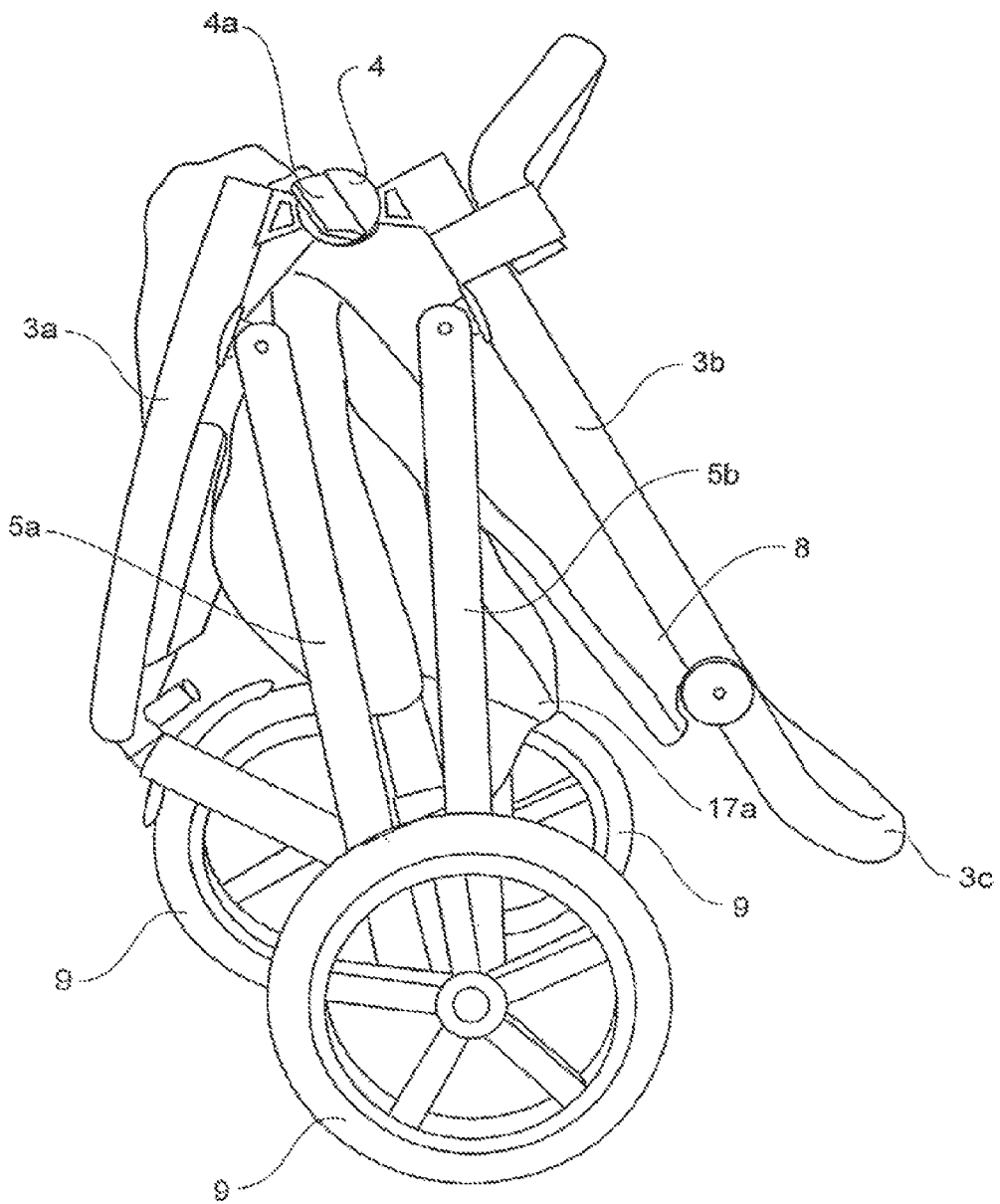
FIG. 10 is a side view of the buggy of FIG. 8, but with the primary seat frame section partly folded around the secondary seat.

The steps for collapsing the frame are shown in FIGS. 3 to 5, and including the material of the seats in FIGS. 8 to 11. The secondary seat frame is caused to disengage from the spigots 19. Once the spigots 19 are disengaged from the recesses 20, the secondary seat frame 17 can be pivoted upward and forward about the cross bar as shown in FIG. 3 until it is in a position generally parallel with the rearward struts 5b as shown in FIGS. 4 and 9.

In the embodiment shown, the primary seat is inverted to the position shown in FIG. 8 before the secondary seat is pivoted upward and forward to the position shown in FIGS. 4 and 9. It will be appreciated that in normal use, the primary seat will generally hang below the primary seat frame section 3a, 3b.

The couplings 4 can then be released to enable articulation between frame sections 3a and 3b. The couplings 4 comprise quick release levers 4a which provide selective locking and releasing of the coupling. Each coupling 4 comprises a first portion 4b that is fixed relative to one of the frame sections 3a or 3b, and a second portion 4c that is fixed relative to the other of the frame sections 3a or 3b. The two coupling portions 4b, 4c have a locking means that prevents relative rotation between those portions and thereby articulation between frame sections 3a and 3b when the quick release lever 4a is in the position shown in FIG. 2b. For example, the opposed faces of the coupling portions 4b, 4c may have one or more complementary projections and recesses. A biasing means such as a coil spring for example, biases the opposed faces of the coupling portions 4b, 4c away from one another so that the projection(s) and recess(es) are not engaged. However, the leverage from the locked quick release lever 4a; which acts as a cam; will bring the projection(s) and recess(es) into engagement with each other to prevent relative rotation between the coupling portions 4b, 4c. When the frame is to be folded, each quick release lever 4a is moved outwardly, which enables the spring bias to separate the projection(s) and recess(es). That enables relative rotation to occur between the portions 4b, 4c and thereby articulation of the frame section 3a relative to frame section 3b.

Figure 11:
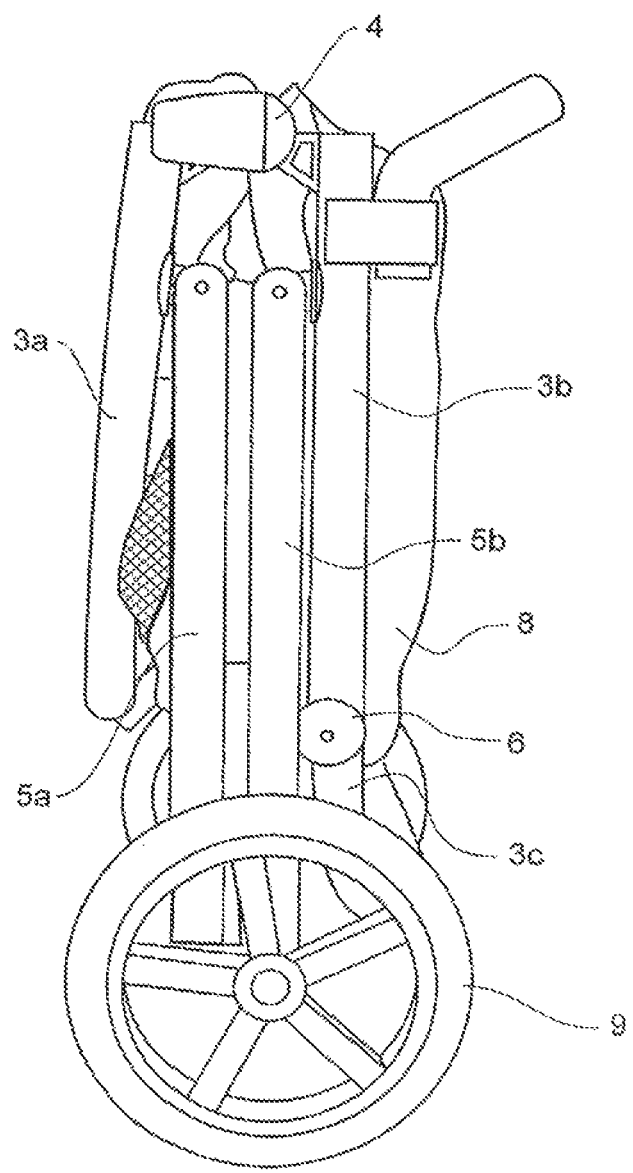
FIG. 11 is a side view of the buggy of FIG. 8, in the fully collapsed configuration.

Once the secondary seat frame 17 has been pivoted to the position shown in FIGS. 4 and 9, the quick release levers 4a are released. The upper frame section 3b is provided with a pull bar 23. By pulling the pull bar 23 upwardly, the couplings 4 move upwardly generally in the direction indicated by arrow U. The articulated connection of the forward and rearward struts 5a, 5b relative to the respective primary seat frame sections 3a, 3b, and the articulation between the struts 5a and 5b, causes the struts 5a, 5b to move towards one another on each side of the buggy. The handle end of the intermediate frame section 3b and the nose end of the forward frame section 3a move downwardly relative to the couplings 4, so that the frame is converted into the storage configuration shown in FIGS. 5, 6, and 11. In that configuration, the buggy is fully collapsed such that the upper frame sections 3a, 3b, and forward and rearward struts 5a, 5b are adjacent and generally parallel to one another. The secondary seat frame 17 is positioned generally within the members 3a, 3b, 5a, 5b, and the secondary seat is positioned generally within the primary seat as shown in FIG. 11. The quick release levers 4a can then be moved inwardly to the lock the couplings 4, to prevent unwanted expansion of the frame from the collapsed storage configuration.

The buggy may be provided with a mechanism that necessitates a double action to be undertaken to release the frame from the position shown in FIG. 4. By way of example only, at least one of the couplings 4 may have an externally mounted latch that engages another part of the coupling. To collapse the frame, both couplings must be released, and the latch must also be released.

To convert the frame from the collapsed storage configuration back to the in use configuration, the process is reversed. That is, the quick release handles 4a are moved outwardly to release the couplings 4 to enable rotation between the coupling portions 4a, 4b. The primary seat frame section 3 can then be extended to the position shown in FIG. 4, and the quick release levers 4a engaged to prevent unwanted movement of the primary seat frame section. The secondary seat frame 17 can then be pivoted downward and rearward until it is in the position shown in FIG. 2a, and then the secondary seat frame is caused to engage with the spigots 19.

It will be appreciated that the above actions can occur whether or not the secondary seat is attached. During movement of the secondary seat frame, at least part of the primary seat must move, at least to some extent, to enable the frame to collapse. In one configuration, said at least part of the primary seat may be manually moved. However, it is preferred that said at least part of the primary seat moves automatically as a result of the secondary seat moving.

In the embodiments shown, at least part of the primary seat is invertible to provide clearance for the secondary seat frame 17. The entire primary seat may be invertible. As the secondary seat frame is pivoted upward and forward, the frame 17 may push against the primary seat causing the movement of said at least part of the primary seat. The upper end of the frame 17a has a somewhat curved configuration to provide a smooth surface that engages the primary seat causing it to move.

Other alternative configurations could be used. For example, the primary seat may be supported by an arrangement that enables the primary seat to move out of the way as the buggy is collapsed, such as hinges, pivots, or the like for example.

In the embodiment shown, the secondary seat is selectively pivotable from an in use position to a storage position, without collapsing the remainder of the frame. The remainder of the frame, and the primary seat, can then be collapsed or folded around the secondary seat frame and secondary seat. It will be appreciated, however, that the quick release levers 4a could be released prior to or during the movement of the secondary seat frame 17, to enable the secondary seat and the remainder of the frame to be collapsed in a more flowing action.

FIGS. 1 to 6 show the secondary seat frame 17 attached to the frame in the first position at least partly behind and at least partly below the primary seat.

In the preferred form, the secondary seat frame is readily detachable from the first position shown in FIGS. 1 to 6, and is readily attachable in a second position shown in FIG. 7 in which the secondary seat is in a second position at least partly above and at least partly in front of the primary seat. To detach the secondary seat from the first position, the secondary seat frame 17 is released from engagement with the spigots. The cross bar couplings 21 are releasable from engagement with the cross bar 7 and/or the secondary seat frame 17. The secondary seat can then be attached in the second position. In that configuration, the pull bar 23 has been removed, and the pull bar couplings 23a are used to couple the secondary seat frame 17 to the intermediate section 3b of the primary seat frame 3. The frame can be collapsed in the manner described above whether or not the secondary seat frame is in the second position shown in FIG. 7.

It will be appreciated that the secondary seat frame, and thereby the secondary seat, can be supported in the second position by means other than the pull bar couplings.

The primary seat is preferably convertible from a sitting configuration for supporting a toddler to a lying configuration for supporting a baby. That, and the option of two attachment positions for the secondary seat, enables the preferred form buggy to "grow" with the family. That is shown schematically in FIG. 12a-12d.

Figure 12A:
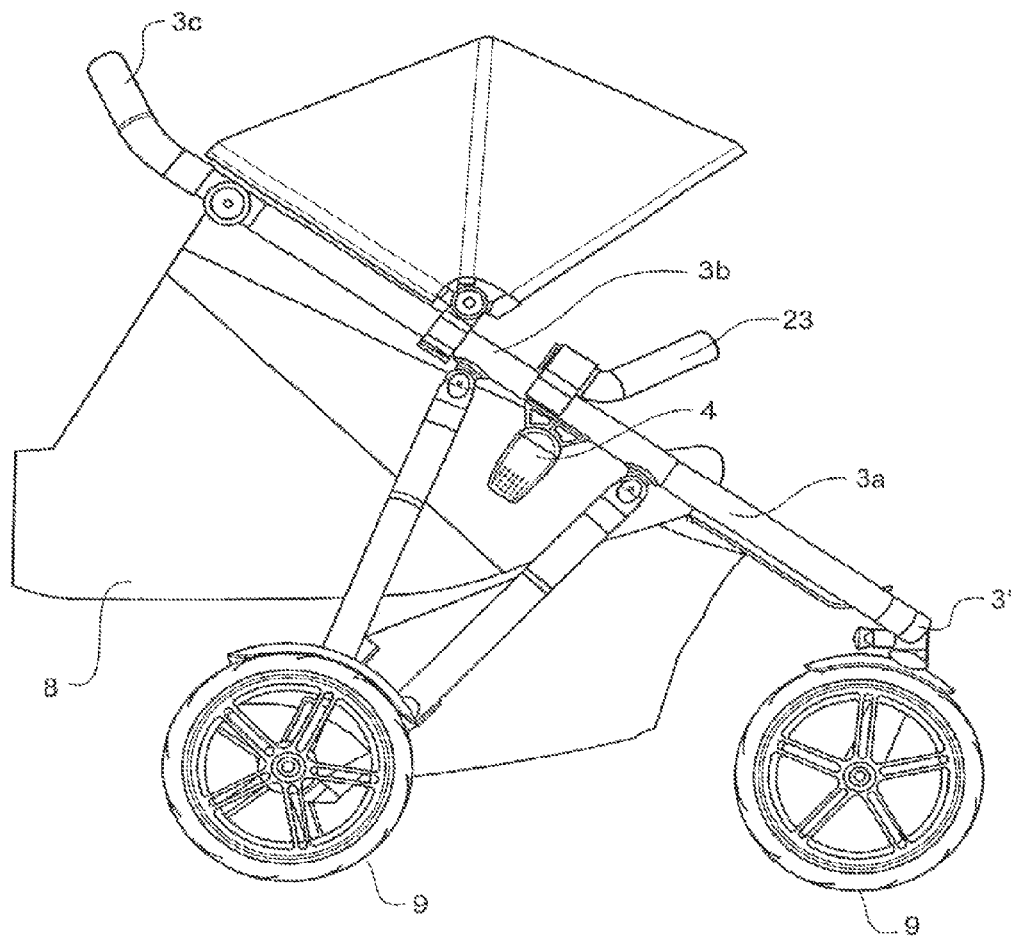
FIGS. 12a to 12d schematically show the various support positions for children in the preferred embodiment buggy, showing how the buggy can "grow" with a family.

FIG. 12a shows the buggy in the configuration in which the primary seat is in a lying configuration for supporting a newborn or baby. The adjustment of the primary seat from the sitting to lying configuration can occur by adjusting zips, clips, straps, or any other suitable means that enables the portion of the primary seat that forms a back support in the sitting configuration to move toward horizontal to support the child in a lying configuration. Intermediate positions between fully sitting and fully lying may be provided.

Figure 12B:
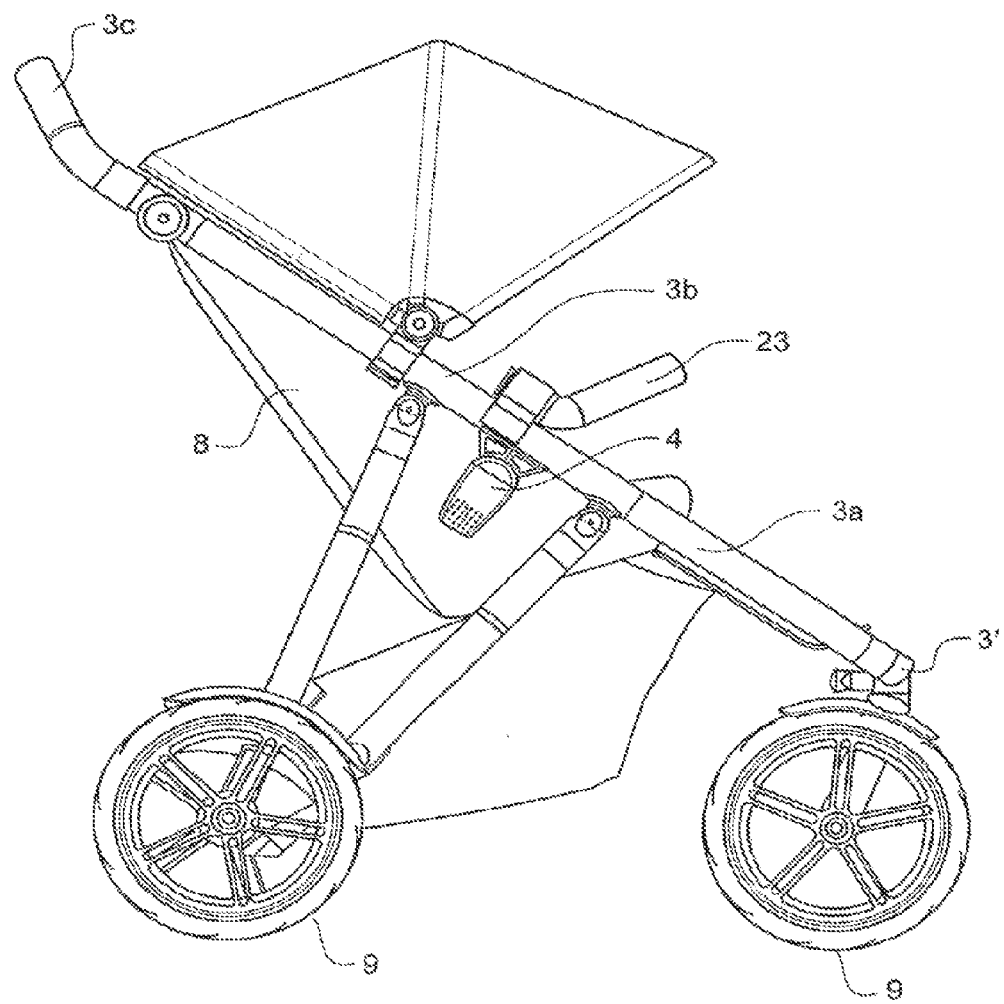

As the child grows into a toddler, the primary seat can be used in the sitting configuration to support the back of the toddler in a more upright position. This is shown in FIG. 12b.

Figure 12C:
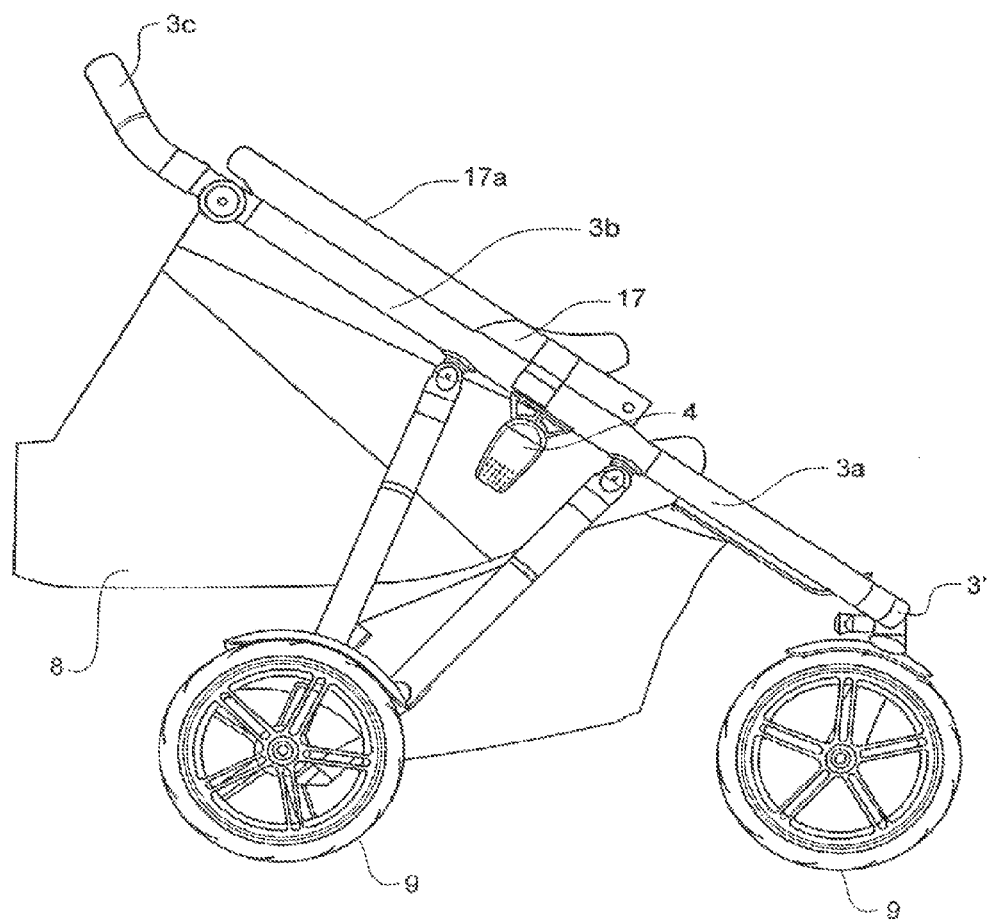
Figure 12D:
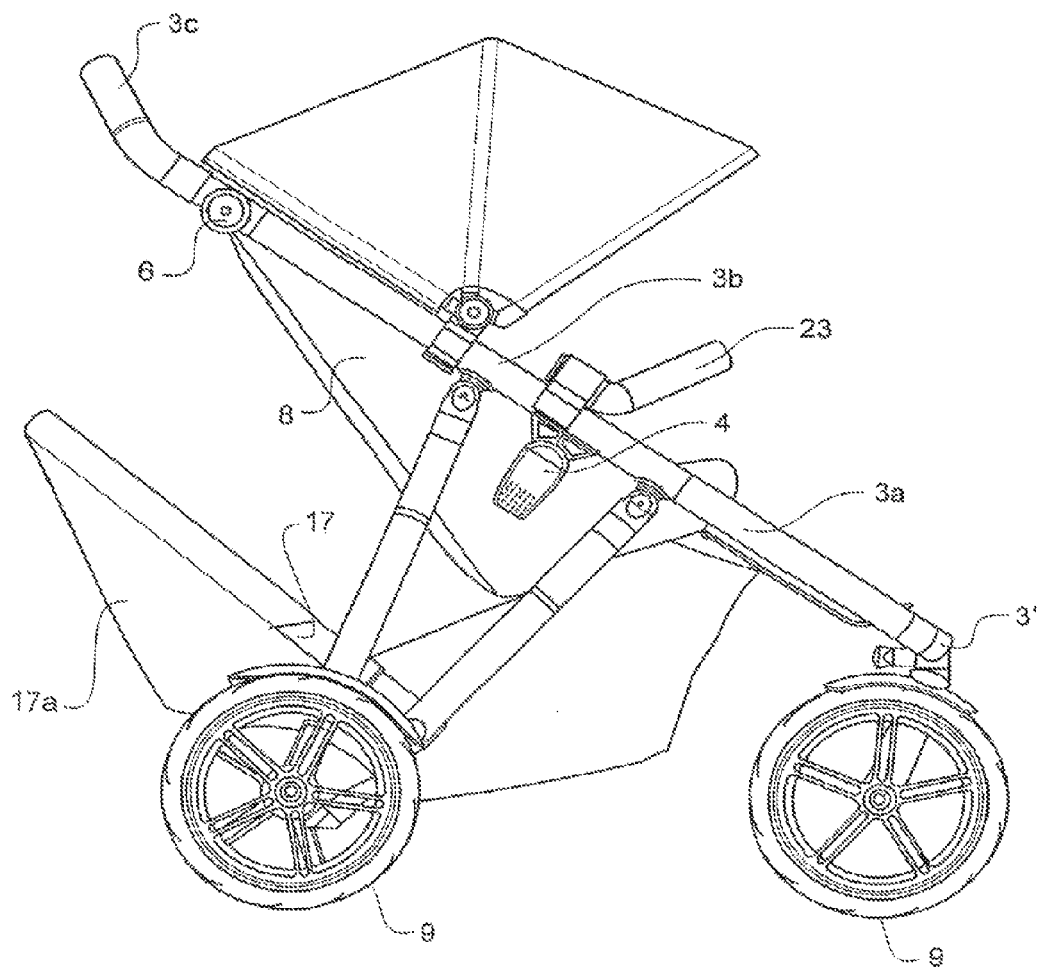

If a family then has another baby, the baby can be supported in the primary seat in its lying configuration as shown in FIG. 12c, with the toddler supported in the secondary seat in the second attached position at least partly above and at least partly in front of the primary seat. It can be seen that the secondary seat is at least partly in front of the section of the primary seat 8 that will support the lying baby. When both children reach the toddler stage, the larger child can be supported in the primary seat in its sitting configuration, and the smaller child can be supported in the secondary seat in the first attached position at least partly behind and at least partly below the primary seat, as shown in FIG. 12d.

The above describes preferred embodiments of the present invention, and modifications can be made thereto without departing from the scope of the invention.

For example, while the secondary seat is described as being readily attachable to and detachable from the frame, that is not essential. Alternatively, the buggy could be provided in the dual in-line configuration having a fixed primary seat for supporting the first child, and a fixed secondary seat for supporting the second child and that is positioned at least partly behind and at least partly below the primary seat. The secondary seat will be attached in a manner such as that described above that allows the buggy to be collapsed. The secondary seat will generally be smaller than the primary seat.

Additionally, the buggy is described as a three wheel buggy. Rather than having a single front wheel, dual front wheels could be provided in some configurations.

Various couplings are shown by way of example only, and different couplings or attachment means could be used while still providing the desired functionality. For example, the handle 3c couplings 6 are described as being frictional mechanism to enable tilting of the handle 3c to selected positions relative to the intermediate frame section 3b. Alternatively, the handle could be fixed relative to the frame, or locking couplings of the type described for the frame couplings 4 could be used.

Similarly, rather than using fully locking frame couplings between the intermediate 3b and forward 3a frame sections, the frame couplings 4 could use a frictional mechanism.

Rather than having a seat configuration that has a seat frame and a fabric, membrane, or the like mounted to the frame, at least one of the seats may be a more rigid material such as a polymeric material. If the primary seat is a more rigid material, the seat will need to pivot or hinge out of the way of the secondary seat as the secondary seat is moved.

While the preferred embodiment buggy is shown as an "all terrain" type of buggy that is suitable for some off road use, it will be appreciated that the invention can be applied to any suitable type of pushing vehicle for transporting children. Therefore, the term "buggy" as used in this specification and claims should be interpreted to cover other alternative pushing vehicles, such as strollers, push chairs, and the like.

The primary seat may be permanently attached, detachable, or readily attachable and detachable.

Other possible modifications are listed in the "Summary of the Invention" section.

The preferred form buggy can readily transport two children, yet provides a compact collapsed configuration with two seats without detaching the secondary seat.

What is claimed is:

1. A buggy for transporting children, comprising:
   a frame comprising a primary seat frame for supporting a primary seat;
   a plurality of wheels that are rotatably mounted relative to the frame to support the frame above a ground surface and which enable the buggy to be moved along the ground surface;
   a forward-facing primary seat operatively supported by the frame for supporting a first child;
   a readily attachable and detachable forward-facing secondary seat operatively supported by the frame for supporting a second child, the secondary seat being positioned at least partly behind and at least partly below the primary seat, wherein:
   the buggy is convertible between an in use configuration for transporting children and a folded configuration without removing the secondary seat;
   the secondary seat is selectively movable from an in use position to a storage position without folding the remainder of the buggy; and
   following movement of the secondary seat to the storage position, the remainder of the buggy is selectively foldable around the secondary seat.

2. A buggy as claimed in claim 1, wherein the secondary seat is positioned at least partially within the frame when the buggy is in the folded configuration.

3. A buggy as claimed in claim 2, wherein the primary seat frame is configured to fold when the buggy is in the folded configuration, and the secondary seat is positioned at least partially within the folded primary seat frame when the buggy is in the folded configuration.

4. A buggy as claimed in claim 1, wherein the secondary seat is smaller than the primary seat.

5. A buggy as claimed in claim 1, wherein the secondary seat is pivotally supported by the frame.

6. A buggy as claimed in claim 1, wherein the primary seat is convertible from a sitting position for supporting a toddler to a lying position for supporting a baby.

7. A buggy as claimed in claim 1, wherein the primary and secondary seats each comprise a seat portion and back portion.

8. A buggy for transporting children, comprising:
   a frame comprising a primary seat frame and a secondary seat frame;
   a plurality of wheels that are rotatably mounted relative to the frame to support the frame above a ground surface and which enable the buggy to be moved along the ground surface;
   a forward-facing primary seat operatively supported by the primary seat frame for supporting a first child; and
   a forward-facing secondary seat operatively supported by the secondary seat frame for supporting a second child, the secondary seat being readily attachable and detachable at a forward-facing position at least partly behind and at least partly below the primary seat,
   wherein the primary seat frame comprises a first section and a second section connected via one or more couplings, the first section configured to rotate relative to the second section via the one or more couplings.

9. A buggy as claimed in claim 8, wherein the buggy is convertible between an in use configuration for transporting children and a storage configuration without removing the secondary seat.

10. A buggy as claimed in claim 9, wherein the first and second sections of the primary seat frame each comprise a first end connected to at least one of the one or more couplings, and a second end opposite the first end, and the storage configuration is a folded storage configuration in which the second ends of the first and second sections of the primary seat frame are moved towards one another.

11. A buggy as claimed in claim 9, wherein the buggy is convertible between the in use configuration and the storage configuration whether or not the secondary seat is attached to the frame.

12. A buggy as claimed in claim 9, wherein the secondary seat is positioned at least partially within the primary seat frame in the storage configuration.

13. A buggy as claimed in claim 12, wherein the secondary seat is positioned at least partially between the first and second sections of the primary seat frame in the storage configuration.

14. A buggy as claimed in claim 8, wherein the secondary seat is selectively movable from an in use position to a storage position without folding the remainder of the buggy, and following movement of the secondary seat to the storage position, the remainder of the buggy is selectively foldable around the secondary seat.

15. A buggy as claimed in claim 8, wherein the first section of the primary seat frame is configured to rotate up to 180° relative to the second section of the primary seat frame.

16. A buggy as claimed in claim 8, wherein at least one of the one or more couplings includes one or more quick release levers configured to switch between a first position allowing the first section of the primary seat frame to rotate relative to the second section of the primary seat frame, and a second position holding the first and second sections of the primary seat frame at an articulated position.

17. A stroller for transporting children, comprising:
    a frame comprising a primary seat frame for supporting a primary seat;
    a plurality of wheels that are rotatably mounted to the frame to enable movement of the stroller about a ground surface;
    a forward-facing primary seat connected to the frame and configured to support a first child;
    a forward-facing secondary seat connected to the frame and configured to support a second child, the secondary seat being readily attachable and detachable at a forward-facing position at least partly behind and at least partly below the primary seat;
    wherein the stroller is convertible between an in use configuration for transporting children and a storage configuration without removing the secondary seat.

18. A stroller as claimed in claim 17, wherein the secondary seat is selectively movable from an in use position to a storage position without collapsing the primary seat frame of the stroller, and following the movement of the secondary seat, the primary seat frame is selectively collapsible around the secondary seat.

19. A buggy as claimed in claim 17, wherein the primary seat frame comprises a first section and a second section connected via one or more couplings, and one or more of the couplings comprises one or more quick release levers configured to switch between a first position allowing the first section to rotate relative to the second section, and a second position holding the first and second sections at an articulated position.

20. A buggy as claimed in claim 17, wherein the secondary seat is positioned at least partially within the primary seat frame in the storage configuration.

* * * * *